Feb. 20, 1962  T. T. BROWN  3,022,430
ELECTROKINETIC GENERATOR
Filed July 3, 1957  2 Sheets-Sheet 1

INVENTOR
THOMAS TOWNSEND BROWN
BY
Watson, Cole, Grindle & Watson
ATTORNEYS

Feb. 20, 1962 T. T. BROWN 3,022,430
ELECTROKINETIC GENERATOR
Filed July 3, 1957 2 Sheets-Sheet 2
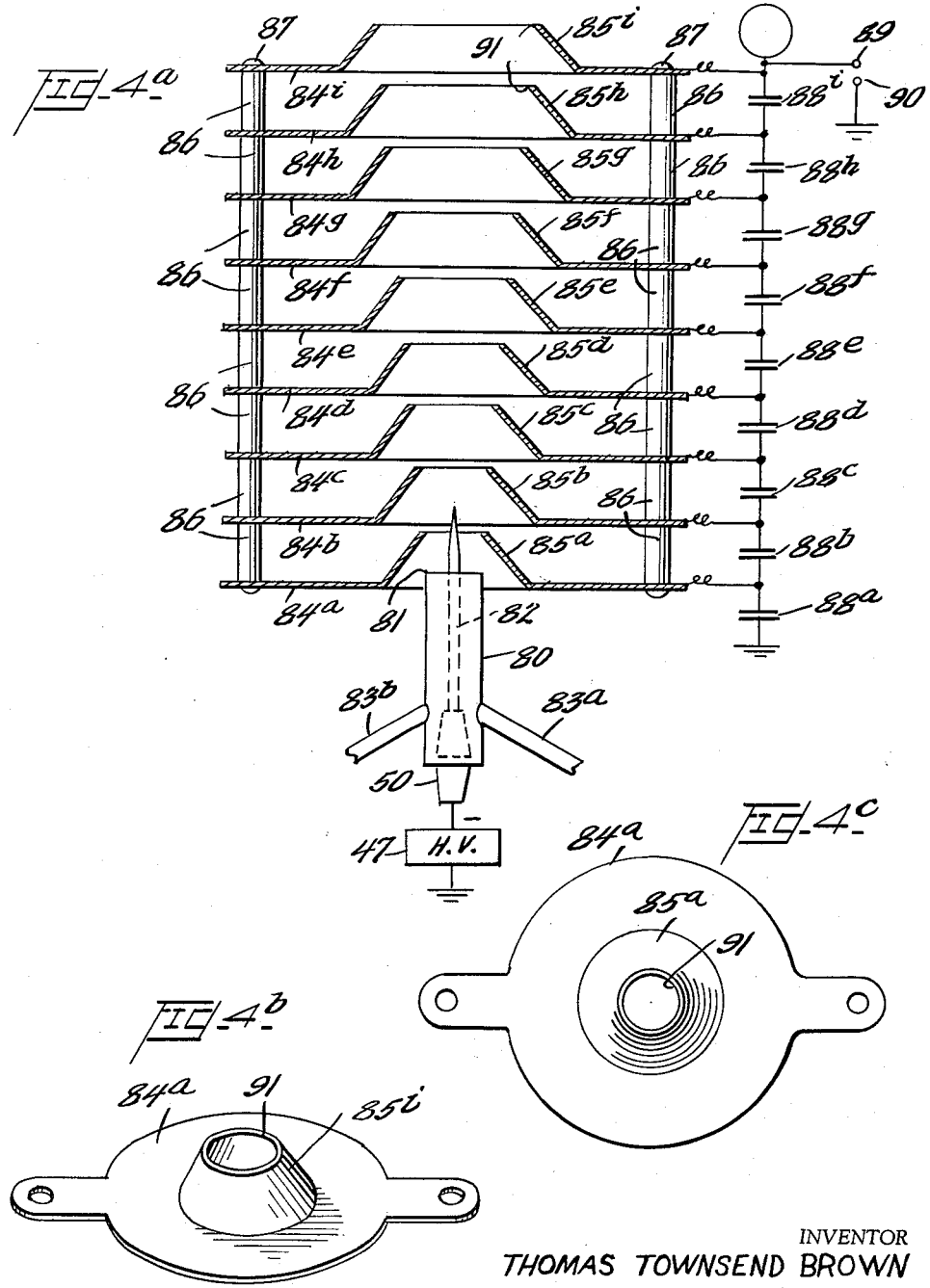
INVENTOR
THOMAS TOWNSEND BROWN
BY Watson, Cole, Grindle & Watson
ATTORNEYS

United States Patent Office 3,022,430
Patented Feb. 20, 1962

3,022,430
ELECTROKINETIC GENERATOR
Thomas Townsend Brown, Umatilla, Fla., assignor to Whitehall-Rand, Inc., Washington, D.C., a corporation of Delaware
Filed July 3, 1957, Ser. No. 669,727
18 Claims. (Cl. 310—5)

My invention relates to electrokinetic methods and apparatus, more particularly to electrokinetic apparatus, for generating and utilizing electrical potentials.

Priorly, the thermal energy of burning fuel has been first converted into mechanical energy of motion which in turn was used to generate electrical energy, the well-known boiler-steam-turbine electrical generator arrangement being a familiar example. However, in accordance with this invention the energy of a burning fuel is directly converted into electrical energy. In accordance with other aspects of this invention, the kinetic energy of a stream of dielectric fluid such as carbon dioxide may be converted directly into electrical energy. Further, the principles of this invention may be applied to apparatus for the generation of very high voltages by a series of conversion devices. Still further, the electrical energy so generated may be employed as a motive force to propel the generator relative to the surrounding medium.

Accordingly, it is an object of this invention to provide a method and apparatus for directly converting the kinetic energy of a fluid stream to an electrical potential.

It is another object of this invention to provide a method and apparatus for directly converting the kinetic and thermal energy of a burning fuel into electrical energy.

It is a further object of this invention to provide a method and apparatus wherein a fluid stream is utilized to transport electrical charges from one electrode to another.

It is a feature of this invention to provide apparatus for generating high voltages which includes a body, a jet or fluid stream source connected to the body, an electrode connected to the body and a source of voltage connected to the electrode for delivering electrical charges to the jet.

It is another feature of this invention to position a jet or fluid stream source within a body, to mount an electrode on the body in the path of the stream and to connect a source of high voltage between the body and the electrode to thus provide a self-propelled vehicle.

It is another feature of this invention to provide apparatus for generating high voltages which includes a body, an electrode mounted on one edge of the body and another electrode mounted on the other edge of the body, to connect a source of high voltage between the electrodes and to position a fluid stream source to direct a fluid stream over one of the electrodes.

It is another feature of this invention to provide a self-propelled vehicle which vehicle includes a body, two electrodes mounted on the periphery of the body, a source of high voltage connected between the electrodes, and a flame jet source connected to the body to direct a flame jet over one of the electrodes.

It is a further feature of this invention to provide a high voltage generator which includes a body and an electrode positioned axially within the body, the body having an orifice or nozzle axially aligned with the electrode, a source of high voltage connected between the body and the electrode and a jet source to direct a fluid stream axially of the body.

It is a further feature of this invention to provide apparatus for developing and converting a high direct current voltage to a low direct current voltage which apparatus includes a body having a nozzle, an electrode positioned substantially axially of the nozzle, a jet source directing a fluid stream along the nozzle, a high voltage source connected between the body and the electrode, a collector screen positioned in the path of the nozzle for collecting the charged particles delivered by the fluid stream from the electrode and a circuit connected between the collector screen and the body for converting the high direct current voltage developed between the screen and the body to a low direct current voltage.

It is a further feature of this invention to connect a converting circuit between a jet generator and a collector screen to convert the high voltage developed between the generator and the screen to a low direct current voltage which circuit includes a group of serially connected capacitors and a commutating capacitor adapted to be sequentially connected to the serially connected capacitors to cause a low voltage high amperage output to be delivered across one of the serially connected capacitors.

It is still another feature of this invention to provide a high voltage direct current generator which includes a jet source, a body having a nozzle and connected to the jet source and an electrode positioned axially of the nozzle, a source of high voltage connected between the electrode and a source of reference potential and a series of plates each having orifices positioned in the path of the jet issuing from the nozzle, each of the plates being connected to one of a group of serially connected capacitors, one end of the group of capacitors being connected to a source of reference potential.

It is a still further feature of this invention to provide high voltage direct current generators which include a body having a nozzle, a fluid stream source connected to the body and directing a fluid stream along the nozzle, an electrode positioned axially of the nozzle, a source of high voltage connected between the electrode and a source of reference potential, a series of conically shaped plates positioned in the path of the stream and connected to a circuit for delivering a high direct current voltage.

Other objects and advantages of my invention will be apparent from a consideration of the following specification, read in connection with the accompanying drawings, wherein.

FIGURES 4a, 4b and 4c disclose another illustrative embodiment of a high voltage generator in accordance with this invention.

Figure 1:
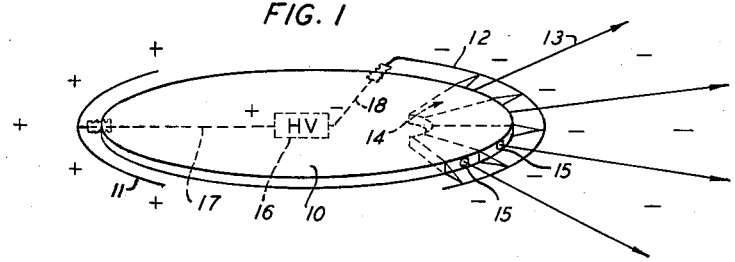
FIGURE 1 is a perspective diagrammatic view illustrating the general form and construction of a mobile vehicle utilizing flame jets as a means for transporting electrical charges away from the body of the machine.

FIGURE 1 shows how the principles of this invention may be utilized in a mobile vehicle wherein flame jets are employed to generate the electrical potentials of extremely high magnitude, thus providing an extremely large propulsive force. The machine shown in FIGURE 1 comprises a hollow disc-like body 10 on which is insulatably mounted a leading edge electrode 11 electro-conductive to form in effect a body electrode. From the rear edge of the body 10 is supported an insulated, trailing edge electrode 12. It will be understood that there is mounted within the hollow body 10 the necessary apparatus for producing a plurality of rearwardly directed fluid streams or jets such as flame jets, each represented in FIGURE 1 by one of the arrows bearing the reference character 13, such apparatus being indicated diagrammatically by the dotted line portions and being indicated generally by the reference character 14. It will be understood that such apparatus provides a plurality of rearwardly directed jet nozzles, such as the nozzle indicated at 15 in FIGURE 1, and it will be understood that the aft electrode 12 is arranged to intersect the axis of the jet issuing from each such nozzle.

As is represented diagrammatically in FIGURE 1, a source 16 of high voltage electrical potential is mounted within the hollow body 10 with its positive and negative terminals connected, respectively, to the forward electrode 11 and the trailing electrode 12, such connections being effected as by means of suitably insulated conductors 17 and 18. Negative charges, either in the form of electrons, negative ions, or negatively charged particles, are given up from the trailing conductor 12 to the jets, either because of the fact that the conductor is heated to a very high temperature by being immersed in the flame jets and so capable of thermionic emission, or due perhaps to the magnitude of the applied potential being sufficient to cause a partial ionization of the medium immediately surrounding the issuing jet, and due undoubtedly in part to the scrubbing action of the jet over the surface of the electrode in a manner analogous to the electrification of bodies by friction as, for example, when an amber rod is rubbed with a silken cloth.

Regardless of how the transfer takes place, it is clear that negative charges are injected into the jets by the trailing electrode 12. These negative charges are swept to the rear with the fluid stream at extremely high velocity and to a very great distance. This phenomenon continues and negative charges are steadily removed from the forward electrode 11 resulting in the electrode 11 acquiring a progressively higher positive charge. This charging of the electrode 11 will continue until an equilibrium is reached when the electrically charged particles escape from the jets and return to the forward electrode 11 at the same rate at which negatively charged particles are injected into the jets. It is believed that potential differences between the body and the gas cloud left in the wake of the vehicle by the fluid stream may be as high as fifteen million volts. It will be seen that when this condition obtains, the forward electrode 11 of the mobile vehicle itself corresponds to the positively charged leading conductor of the electrokinetic propulsive device disclosed and described in detail in my application Serial No. 669,830, filed July 3, 1957. The products of combustion or the fluid stream left in the wake of the vehicle correspond to the negatively charged body of the propulsive device disclosed in the above mentioned application. Thus, between the mobile vehicle itself and the gas cloud or fluid stream left in its wake, there is produced a force tending to move the surrounding medium past the mobile vehicle and to the rear of the trailing gas cloud. This force, of course, is accompanied by an equal and opposite reaction which serves to propel the mobile vehicle forward. With such an arrangement, the trailing electrode acts as a source of charged particles and the fluid stream acts through its kinetic energy to stimulate the emission from the trailing electrode. If the stream or jet is a flame jet, then the heat of the jet causes thermionic emission from the electrode in addition to the emission caused by the kinetic energy of the stream.

For these reasons any dielectric stream will produce the desired results. For example, a carbon dioxide generator may serve as the jet source. It is, however, preferred to use a flame jet source such as a burning hydrocarbon for the additional thermionic emission mentioned above.

By reason of the large dimensions involved and the extremely high potentials generated, the propulsive force so produced is very large. This is mentioned because while an augmenting thrust will, of course, be established by the issuing flame jets 13 alone, this thrust will be small compared to the electrokinetic thrust developed, the orifice 15 of the flame jets 13 being used primarily for generating the extremely high propulsive potential which is developed by the apparatus.

Figure 2:
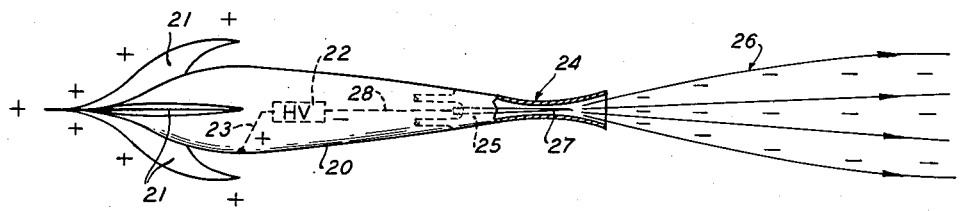
FIGURE 2 is a side elevational view of a mobile vehicle utilizing a flame jet as a means for transporting electrical charges away from the body of the machine, parts of body 20 being broken away to show the details of the interior construction.

In FIGURE 2, I have illustrated a differently shaped vehicle operating in a manner similar to that just described with reference to FIGURE 1. The vehicle illustrated in FIGURE 2 preferably comprises a torpedo-like body 20 fitted at its forward end with suitable fins 21 for controlling the direction of motion of the vehicle. The body 20 is hollow and is used to enclose, among other things, a source 22 of high voltage electrical potential. The positive terminal of the source 22 is connected to the electrically conductive body 20, as is represented for example at 23. The after portion of the body 20 is formed to define a nozzle which is indicated generally by the reference character 24, there being mounted in the after part of the body a suitable fluid stream source 25 such as a combustion chamber for burning an appropriate fuel to produce jet 26 issuing rearwardly from the nozzle 24. An electrode 27 is positioned within the rearward portion of the body 20. This electrode preferably extends axially through the rearward portion of the body terminating in a sharp point in the center of the throat of the nozzle. This electrode is connected as shown at 28 to the negative terminal of the high voltage source 22. In the instance of the flame jet, electrode 27 acts as a thermionic cathode.

The apparatus operates similarly to the device described with reference to FIGURE 1. The electrode 27 serves to inject negative charges into the issuing flame jet 26, which in turn serves to supply kinetic energy to those charges, sweeping them into a cloud behind the vehicle. As a result, the body 20 becomes charged positively and the potential between the body and the cloud of gases left by the issuing flame jets continues to increase until an equilibrium is established as described above. In a manner similar to that mentioned with reference to the electrokinetic vehicles in my application Serial No. 669,830 filed July 3, 1957, the mobile vehicle itself becomes the positively charged leading conductor and the electrode 27, flame jet 26 and resulting charged gas cloud becomes the negatively charged parts 26 of the system. The propulsive force is that which is applied to move the surrounding dielectric medium to the rear and toward the jet and trailing gas cloud, as previously described. As in connection with the vehicles the apparatus described in the above-mentioned application Serial No. 669,830, the thrust developed by the issuing flame jet serves merely to augment the large thrust produced by the generated electrostatic potential, the flame jet serving principally to produce the very high potential which is in turn responsible for a large part of the propulsive force developed.

Figure 3:
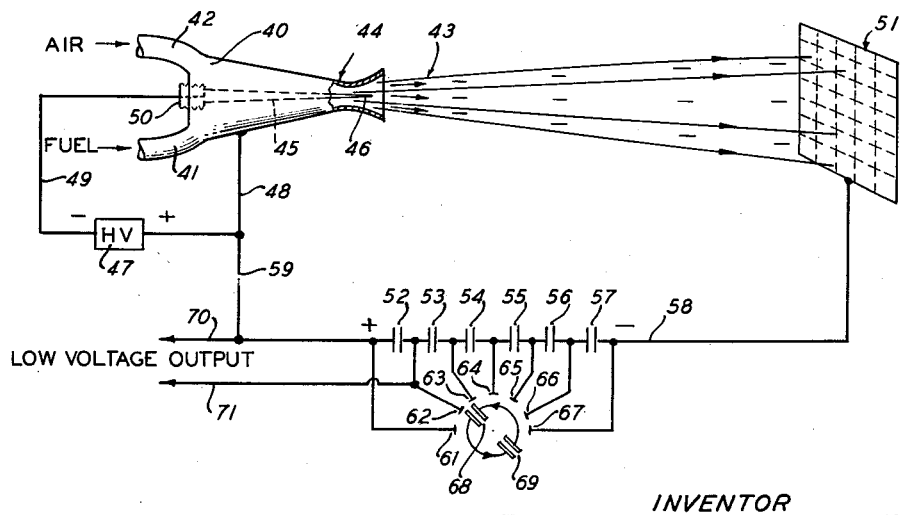
FIGURE 3 is a diagrammatic representation illustrating apparatus for the direct conversion of the energy of a burning fuel into electrical energy.

In the illustrative embodiment of FIGURE 3 is shown the manner in which the flame jet generator principle described with reference to FIGURES 1 and 2 may be embodied in an apparatus for the generation of electricity for domestic or commercial use. The apparatus as shown in FIGURE 3 utilizes a hollow body 40 constituting a combustion chamber of suitable type in which the fuel is fed as by means of a conduit 41 and air or oxygen is fed as by means of a conduit 42. The suitably mixed fuel and air are burned within the combustion chamber to produce a high velocity flame jet 43 which issues from the chamber through a nozzle 44 formed as a part of the combustion chamber.

An electrode 45 is suitably supported within the chamber 40 and extends substantially axially through the chamber to terminate in a sharp needle-like point 46 in the throat of the nozzle 44. A source of very high voltage electrical potential 47 is arranged with its positive terminal connected as shown at 48 to the body 40 and its negative terminal connected to the electrode 45 as by means of a conductor 49, it being understood that the electrode 45 is suitably insulated from the body 40 as by means of an insulating bushing 50.

The structure just described will operate in the same manner as the jet high voltage generators described with reference to FIGURES 1 and 2, negative charges being rapidly transported away from the body 40 by the issuing flame jet 43. These negative charges may be collected by a grid-type electrode 51 positioned within the path of the flame jet. As may be readily appreciated, the grid electrode 51 will become increasingly negative and the body 40 will become increasingly positively charged unless current is drawn from the apparatus.

In order to permit the potential energy developed by the apparatus shown in FIGURE 3 to be utilized in the form of an electric current, I provide storage means in the form of electrical capacitors which are connected between the body 40 and the grid electrode 51. In order that the extremely high voltages developed may be thus stored, I prefer to use a plurality of such capacitors connected in series as is represented, for example, at 52, 53, 54, 55, 56 and 57 in FIGURE 3, these capacitors having the free end terminals connected, respectively, to the screen electrode as by a conductor 58 and as by conductors 59 and 48 to the aforementioned body 40.

Since the electrical potential generated by the generator just described is of the direct type as distinguished from an alternating electrical potential, it is not subject to transformation to lower voltages through the use of ordinary transformers as is the case with ordinary alternating current. In order therefore to permit the voltage to be reduced to a sufficiently low value and at the same time to increase the available current to permit it being used for domestic or commercial purposes, I provide a capacitor-commutator type of transforming apparatus which serves to thus reduce the voltage for use at the point of utilization.

To this end, I provide a number of stationary contact segments 61–67 arranged in a circle and electrically connected to the terminals of the capacitors 52–57 as shown in FIGURE 3. A pair of capacitors 68 and 69 are mounted for rotation relative to the contact segments 61–67 so that the plates or terminals of the capacitors 68 and 69 will be moved to positions successively bridging adjacently disposed pairs of stationary segments. Thus, as seen in FIGURE 3, assuming the rotating capacitors to be turned in a counterclockwise direction, the capacitor 69 will first bridge the segments 66 and 67 so as to be charged to a voltage equal to that to which the condenser 57 is charged. The condenser 69 is next moved to a position connecting it in parallel with the condenser 56, and so on until it is finally connected in parallel with the condenser 52. At this point it should be observed that the condenser 52 is connected directly across the two output lines 70 and 71 which extends to the point of utilization and across which the load to be served is connected. Thus the condenser 52 is steadily giving up its charge to the load which is connected to the output conductors and is therefore at a lower potential than the highly charged condenser 69. Thus when the condenser 69 is moved to a position bridging the segments 61 and 62, it gives up a part of its charge to the condenser 52 to raise the voltage thereof. As soon as the condenser 69 leaves the described connection with the condenser 52, the alternate rotating condenser 68 is brought into bridging relationship with the first condenser 57.

By rotating condensers 68 and 69 at a very rapid rate, the charge carried by each of the condensers 52–57 is steadily equalized and electrical energy is by this means continually poured into the supply condenser 52 for utilization by the load connected to the output lines 70 and 71.

Since the voltage applied across the series connected assembly of condensers 52–57 is thus divided among all of the condensers employed, it is apparent that a voltage reduction of substantially any desired magnitude may be obtained by appropriately selecting the number of condensers used. Thus, as shown, where six condensers are connected in series, the voltage which is applied to the feeder line closely approaches one-sixth the potential difference between the body 40 and the screen grid 51. A greater reduction in voltage may be obtained by utilizing a greater number of series connected capacitances.

The advantage of direct current for domestic and commercial uses has long been recognized, but such use of direct current has been largely prevented by the fact that heretofore it has been substantially impossible to effect any transformation of the voltage. As is well known, in order to minimize heating losses and the amount of conductor material required in transmitting electrical energy over substantial distances, it is necessary that the transmission be accomplished at high voltages. This fact alone has made it almost impossible to use direct current for domestic and commercial uses because of the impossibility of transforming the transmitted high voltage to a low voltage suitable for use at the point of utilization. It will be appreciated, however, that with the apparatus shown in FIGURE 3, the voltage dropping device shown therein may be used if necessary to reduce the generated voltage to a suitable intermediate voltage for transmission by the output lines 70 and 71. At centrally located substations, other transformation devices of the same character may be employed further to reduce the voltage from the value used for transmission to a value suitably low for direct utilization at the point of consumption.

Referring now to FIGURE 4a, there is depicted another illustrative embodiment of a jet high voltage generator in accordance with this invention, a body 80 having a nozzle 81 and an electrode 82 within the body and extending axially through the nozzle and a source of high voltage connected between the electrode and a source of reference potential. The connection between source 47 and electrode 82 is insulated from body 80 by means of a bushing 50. A fluid stream source such as a combustion chamber is located within the body and is supplied with combustible material by means of connections 83a and 83b. For example, oxygen or air may be supplied through connection 83a while fuel may be supplied through connection 83b. A series of plates 84a through 84i are located in the path of the jet and each of the plates has a conically shaped portion 85 which portion has an aperture axially positioned with respect to the nozzle 81. The conically shaped portions 85a through 85i have orifices which are progressively larger as they are positioned more remotely from the nozzle. Each of the plates 84 is spaced from the next adjacent plate by means of insulators 86 and the series of plates are connected mechanically by any convenient means such as insulating rods 87. A series of capacitors 88a through 88i are connected between a source of reference potential and output terminals 89 and 90. Each of the plates 84 is connected to a point intermediate one of the pairs of condensers.

FIGURE 4c is a plan view of plate 84i while FIGURE 4b is a view in perspective of plate 84i. FIGURES 4a and 4b merely illustrate the conically shaped portion of the plate which may advantageously have a sharp edge or even a jagged edge around aperture 91. The advantages of such a sharp or jagged edge will be substantially explained.

The operation of the jet generator of FIGURE 4 is as follows. The combustible material is introduced in the combustion chamber within body 80 being ignited by any convenient means such as an electrical spark and the rapid expansion of the gases causes a high velocity fluid stream to be directed along electrode 82 and out through nozzle 81. The charged particles on the surface of electrode 82 and the charged particles around the orifices 91 of each of the plates 84 are collected and moved by the kinetic energy of the jet to the next succeeding plate 84 such that each subsequent plate develops a higher charge than the preceding plate, the highest charge being developed by the last plate, which in this particular example is plate 84i. The charge thus developed on condensers 88a through 88i will be progressively higher the more remote the capacitor is in the series from the source of reference potential. Thus the high voltage tap 89 may be connected to capacitor 88i and the high voltage output may be obtained between output tap or terminal 89 and terminal 90 connected to a source of reference potential. Advantageously orifice 91 will cause a more rapid delivery of charged particles to the fluid stream if the orifices are defined by jagged or sharp-edged structures. While the operation of FIGURE 4a has been explained in conjunction with a flame jet, it is to be understood that any other fluid stream source might be substituted for the combustion chamber and fuel supply. For example, a carbon dioxide generator might be so substituted.

From the foregoing, it will be observed that I have provided electrokinetic apparatus for generating electrical potentials. Further, I have provided apparatus for generating electrical potentials and for directly utilizing such potentials for the production of motive forces to impart relative motion between the generator structure and the surrounding medium. It is to be emphasized that the high voltage power source is of simple construction. While these devices may develop potentials as high as fifteen million volts, the power sources enclosed within the device need only generate a sufficiently high voltage for local ionization and may deliver voltage of the order of magnitude of fifty thousand volts.

It is to be appreciated that the apparatus in accordance with this invention provide for the direct conversion of the energy of a burning fuel into electrical energy. Still further, it is to be noted that the electrical energy generated from the burning fuel is directly converted into a propulsive force as distinguished from prior devices wherein intermediate conversion means are invariably utilized to convert the energy into some intermediate form, such as mechanical energy before it is utilized to produce the propulsive force. It will be appreciated that the savings in first cost and maintenance costs, and in particular, the savings in space and weight requirement, will be enormous. Similarly through elimination of the intermediate conversion devices the efficiency is increased so that proportionately greater propulsive forces and speeds may be obtained with apparatus occupying less space and weighing less than any other power plants conventionally used.

While I have shown and described various embodiments of my invention, it is appreciated that the principles thereof may be extended to many and varied types of machines and apparatus. The invention therefore is not to be limited to the details illustrated and described herein.

I claim:

1. A high voltage generator comprising a body, a fluid stream source including a source of burning fuel connected to the body, an elongated cathode connected to the body and positioned in the combustion path of said burning fuel and a source of voltage connected to said cathode for introducing electrical charges to the stream.

2. A high voltage generator comprising a body having a nozzle, a fluid stream source within said body and directing a fluid stream burning fuel along said nozzle, an elongated cathode in said stream and a source of voltage connected between said body and said electrode.

3. A self-propelled vehicle comprising a body having a nozzle, a fluid stream source within said body and directing a stream of burning fuel along said nozzle, an elongated cathode positioned axially of the nozzle and a source of voltage connected between said body and said electrode.

4. A high voltage generator comprising a body, an electrode mounted on one edge of said body and another elongated cathode mounted on an opposite edge of the body, a source of voltage connected between the electrodes and a fluid stream source connected to said body to direct a burning fluid stream over said cathode.

5. A self-propelled vehicle comprising a body, an elongated cathode and an anode mounted on said body, a source of voltage connected between said electrodes and a flame jet source connected to the body to direct a flame jet over said cathode.

6. A high voltage generator comprising a body having an orifice therein, a cathode connected to said body and located axially of said orifice, a flame jet source connected to said body to direct a flame jet along said cathode and through said orifice and a high voltage source connected between said body and said cathode to supply charged particles to said jet.

7. Apparatus for developing and converting a high direct current voltage to a low direct current voltage comprising a body having a nozzle, a cathode positioned axially of said nozzle, a jet source directing a burning fluid stream along said cathode through said nozzle, a high voltage source connected between said body and said cathode, a collector screen positioned in the path of said jet for collecting the charged particles delivered by the fluid stream from said cathode and a circuit connected between the collector screen and said body for converting the high direct current voltage developed between the screen and the body to a low direct current voltage.

8. Apparatus for developing and converting a high direct current voltage to a low direct current voltage comprising a body having a nozzle, a cathode positioned axially of said nozzle, a jet source directing a burning fluid stream along said cathode through said nozzle, a high voltage source connected between said body and said cathode, a collector screen positioned in the path of said jet for collecting the charged particles delivered by the fluid stream from the cathode and output means connected to said screen and said body.

9. A high voltage generator comprising a body including a flame jet source, a nozzle in said body for directing the stream from said jet source, a cathode positioned in the path of said stream, a source of high voltage connected between the cathode and said body and a series of plates each having orifices positioned in the path of the jet issuing from the nozzle, each of the plates being connected to an output circuit.

10. A high voltage generator in accordance with claim 9 wherein said output means comprises a plurality of serially connected capacitors, each of said plates being connected intermediate a pair of said capacitors.

11. A high voltage direct current generator comprising a body having a nozzle, a burning fluid stream source connected to said body and directing a flame along said nozzle, a cathode positioned axially of said nozzle, a source of high voltage connected between the cathode and a source of reference potential, a series of conically shaped conducting members having apertures therein, said apertures being axially aligned with said nozzle and output means connected to each of said members.

12. Thrust producing apparatus comprising a first electrode, flame jet means operatively associated with said first electrode to produce a burning stream directed away from said first electrode, a cathode supported in fixed spacial relationship with respect to said first electrode and in the path of said burning stream, and power means connected across said electrodes to apply high voltage potential thereto thereby to collect electrical charges from said first electrode and impart said charges to said stream as it passes said cathode.

13. Thrust producing apparatus comprising a hollow body having an electro-conductive forward portion, jet means within said body to produce a stream of ionizable dielectric medium directed rearwardly from said body portion; a cathode supported in fixed spaced relationship with respect to said body and in the path of said stream and power means within said body and connected between said forward body portion and said cathode to apply a high voltage potential thereacross whereby to transfer electrical charges from said body to said stream as the latter passes said cathode.

14. Thrust producing apparatus comprising a first electrode, a fuel burner associated with said first electrode and adapted to produce a stream of gaseous combustion product directed away from said first electrode, a cathode supported in fixed spaced relationship with respect to said first electrode and in the path of said stream and power means connected across said electrodes to apply high voltage potential thereto whereby to collect electrical charges from said first electrode and impart said charges to said stream as it passes said cathode.

15. Power converting means comprising flame jet means to produce a stream of ionizable dielectric fluid, a cathode in said stream, a second electrode in said stream and downstream from said cathode, a high voltage source having two terminals including a terminal connected to said cathode to impart charges to said stream, and charge collecting means connected between said second electrode and the other terminal of said source.

16. Power converting means comprising a fuel burner adapted to produce a stream of gaseous combustion products, a first electrode defining a cathode in said stream; a second electrode in said stream and downstream from said first electrode; a high voltage source having a terminal connected to said first electrode to impart charges to said stream, and charge collecting means connected between said second electrode and the other terminal of said source.

17. Power converting means comprising jet means to produce a stream of dielectric fluid; a cathode in said stream, a second electrode in said stream and downstream from said cathode, a high voltage source having one terminal connected to said cathode to impart charges to said stream; a plurality of charge collecting condensers connected in series between said first electrode and the other terminal of said source, a charge transfer condenser, a pair of output lines connected across one of said charge collecting condensers and commutator means to connect said transfer condenser sequentially across each of said charge collecting condensers.

18. Voltage charging means comprising a first pair of terminals, a plurality of charge collecting condensers connected in series between said first terminals, a charge transfer condenser, a second pair of terminals and commutator means to connect said transfer condenser sequentially across one after another of said charge collecting condensers and then across said second terminals.

References Cited in the file of this patent

UNITED STATES PATENTS

| | | |
|---|---|---|
| 1,363,037 | Goddard | Dec. 21, 1920 |
| 2,004,352 | Simon | June 11, 1935 |
| 2,210,918 | Karlovitz et al. | Aug. 13, 1940 |
| 2,588,427 | Stringfield | Mar. 11, 1952 |